(12) United States Patent
Cook

(10) Patent No.: US 9,081,644 B2
(45) Date of Patent: *Jul. 14, 2015

(54) DYNAMIC INSERTION AND REMOVAL OF VIRTUAL SOFTWARE SUB-LAYERS

(75) Inventor: Randall R. Cook, Springville, UT (US)

(73) Assignee: Symantec Corporation, Mountain View, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/551,576

(22) Filed: Jul. 17, 2012

(65) Prior Publication Data

US 2012/0297374 A1    Nov. 22, 2012

Related U.S. Application Data

(63) Continuation of application No. 12/058,782, filed on Mar. 31, 2008, now Pat. No. 8,261,254.

(51) Int. Cl.
*G06F 9/44* (2006.01)
*G06F 9/445* (2006.01)
*G06F 17/30* (2006.01)

(52) U.S. Cl.
CPC .. *G06F 8/67* (2013.01); *G06F 8/65* (2013.01); *G06F 8/61* (2013.01); *G06F 17/30067* (2013.01)

(58) Field of Classification Search
CPC .............. G06F 8/61; G06F 8/65; G06F 8/67; G06F 17/30067
See application file for complete search history.

(56) References Cited

U.S. PATENT DOCUMENTS

| | | | |
|---|---|---|---|
| 6,128,647 A | 10/2000 | Haury | |
| 6,931,546 B1 | 8/2005 | Kouznetsov et al. | |
| 7,028,305 B2 | 4/2006 | Schaefer | |
| 7,117,495 B2 | 10/2006 | Blaser et al. | |
| 7,162,724 B2 | 1/2007 | Blaser et al. | |
| 7,165,260 B2 | 1/2007 | Blaser et al. | |
| 7,451,196 B1 | 11/2008 | de Vries et al. | |
| 7,461,086 B1 | 12/2008 | Hurren et al. | |
| 7,461,096 B1 | 12/2008 | Hurren et al. | |
| 7,496,931 B2 | 2/2009 | Cook et al. | |

(Continued)

FOREIGN PATENT DOCUMENTS

| | | |
|---|---|---|
| EP | 1083483 A1 | 3/2001 |
| JP | 2005 284925 A | 10/2005 |

OTHER PUBLICATIONS

Chinese Office Action received in related Chinese patent application CN 20091013320.5 dated Dec. 5, 2012.

(Continued)

*Primary Examiner* — Lewis A Bullock, Jr.
*Assistant Examiner* — Tina Huynh
(74) *Attorney, Agent, or Firm* — ALG Intellectual Property, LLC

(57) ABSTRACT

The disclosure is directed to dynamic insertion and removal of virtual software sub-layers. In one example, a virtual layer associated with a software application is virtually installed and activated in a computing device. A virtual sub-layer associated with a component of the software application is dynamically inserted in the virtual layer. The virtual layer remains active during the dynamic insertion of the virtual sub-layer. In certain embodiments, a process is executed from the virtual layer, a determination is made as to whether the process launched before or after the insertion of the virtual sub-layer, and the inserted virtual sub-layer is selectively made visible or invisible to the process based on the determination.

20 Claims, 14 Drawing Sheets

(56) References Cited

U.S. PATENT DOCUMENTS

| | | | |
|---|---|---|---|
| 7,512,977 B2 | 3/2009 | Cook et al. | |
| 7,519,963 B1 | 4/2009 | Blaser et al. | |
| 7,542,988 B1 | 6/2009 | Cook et al. | |
| 7,549,164 B2 | 6/2009 | Cook et al. | |
| 7,620,956 B2 | 11/2009 | Cook et al. | |
| 7,877,413 B1 | 1/2011 | Cook et al. | |
| 7,886,291 B1 | 2/2011 | Jones et al. | |
| 7,945,897 B1 * | 5/2011 | Cook | 717/121 |
| 7,970,789 B1 | 6/2011 | Blaser et al. | |
| 8,010,961 B1 | 8/2011 | Cook et al. | |
| 8,042,105 B1 * | 10/2011 | Yonat | 717/168 |
| 8,060,940 B2 | 11/2011 | McCorkendale et al. | |
| 8,108,346 B1 | 1/2012 | Hurren et al. | |
| 8,112,392 B1 | 2/2012 | Bunnell et al. | |
| 8,112,767 B1 | 2/2012 | Cook | |
| 8,225,316 B1 | 7/2012 | Bunnell et al. | |
| 8,291,407 B2 | 10/2012 | Greenwood et al. | |
| 8,302,108 B1 * | 10/2012 | Hurren et al. | 719/320 |
| 8,341,648 B1 | 12/2012 | Cook | |
| 8,407,700 B2 | 3/2013 | Bunnell et al. | |
| 2002/0083183 A1 | 6/2002 | Pujare et al. | |
| 2002/0174215 A1 * | 11/2002 | Schaefer | 709/224 |
| 2003/0233490 A1 * | 12/2003 | Blaser et al. | 709/328 |
| 2003/0233647 A1 | 12/2003 | Blaser et al. | |
| 2004/0078568 A1 | 4/2004 | Pham et al. | |
| 2004/0107179 A1 | 6/2004 | Dalrymple, III et al. | |
| 2004/0139128 A1 | 7/2004 | Becker et al. | |
| 2007/0180450 A1 | 8/2007 | Croft et al. | |
| 2008/0091792 A1 | 4/2008 | Mei et al. | |
| 2009/0144510 A1 * | 6/2009 | Wibling et al. | 711/147 |
| 2009/0192780 A1 * | 7/2009 | Carbone et al. | 703/23 |
| 2011/0061045 A1 | 3/2011 | Phillips | |

OTHER PUBLICATIONS

Japanese Office Action received in related Japanese patent application JP 2009-083314 dated Mar. 12, 2013.

Jared Blaser; Process Tracking Application Layered System; U.S. Appl. No. 11/324,571, filed Jan. 3, 2006.

Jordan Sanderson; Methods and Systems for Activating and Deactivating Virtualization Layers; U.S. Appl. No. 12/414,170, filed Mar. 30, 2009.

Lance TeNgaio; Distributed Application Virtualization; U.S. Appl. No. 12/142,549, filed Jun. 19, 2008.

Cynthia Bringhurst; Systems and Methods for Virtualizing Software Associated with External Computer Hardware Devices; U.S. Appl. No. 12/554,413, filed Sep. 4, 2009.

Bradley Baird; Systems and Methods for Merging Virtual Layers; U.S. Appl. No. 12/843,098, filed Jul. 26, 2010.

Michael Spertus; Systems and Methods for Using Virtualization to Implement Information Rights Management; U.S. Appl. No. 12/715,213, filed Mar. 1, 2010.

International Business Machines Corporation; Method for permitting several versions of a module to coexist within a virtual machine; Research Disclosure, Mason Publications; Mar. 1, 2001; vol. 443, No. 177; Mason Publications; Hampshire, GB.

Bradley Baird; Systems and Methods for Using Virtualization of Operating-System-Level Components to Facilitate Software Testing; U.S. Appl. No. 13/048,305, filed Mar. 15, 2011.

* cited by examiner

US 9,081,644 B2

DYNAMIC INSERTION AND REMOVAL OF VIRTUAL SOFTWARE SUB-LAYERS

CROSS REFERENCE TO RELATED APPLICATION

This application is a continuation of U.S. application Ser. No. 12/058,782, filed 31 Mar. 2008, the disclosure of which is incorporated, in its entirety.

BACKGROUND INFORMATION

In computing, when a software update (e.g., a software patch) is to be applied to a software application installed to and running on a computer, the software application and all processes running from the software application must typically be shut down in order for the update to be applied and/or become effective. This shutdown and the resulting downtime can create a significant interruption to normal use and operation of software applications and processes.

Such problems associated with applying updates to software applications are exacerbated for an administrator or organization maintaining a computer system having a large number of computers and/or users. In such a computer system, a coordinated shutdown of software applications and associated processes across the computer system can be unduly burdensome and intrusive.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
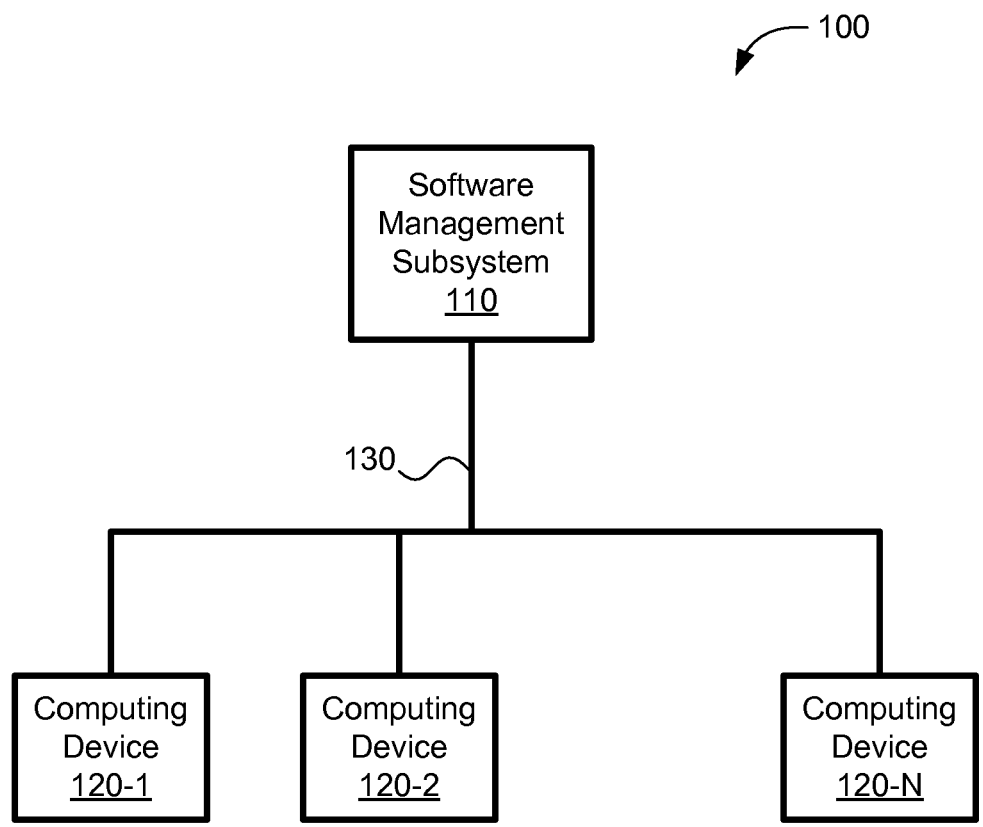
FIG. 1 illustrates an exemplary computing system configured for dynamic insertion and removal of virtual software sub-layers.

The disclosure is directed to dynamic insertion and removal of virtual software sub-layers. The examples disclosed herein may be implemented in numerous ways, including as one or more processes, apparatuses, systems, devices, methods, computer readable media, or computer program products embodied on computer readable media. Exemplary systems, apparatuses, computer program products embodied on computer readable media, and methods for dynamic insertion and/or removal of software sub-layers are described herein.

As used herein, the terms "software" and "software application" refer broadly to any set of computer readable instructions embodied on one or more computer readable media, the instructions being executable by a computing device. The computing device may execute one or more processes from the software application, as is well known. Software applications may include one or more computer programs and any components of and/or processes run from the computer programs. A "component" of a software application may include any subset of features, data, or functionalities associated with, or that may be applied to, the software application. In certain embodiments, a component of a software application may include one or more updates (e.g., software patches) that may be applied to the software application.

"Virtualization" of software refers to performance of one or more operations to virtually install the software to a computing device such that the software, and/or one or more components of the software, may be conveniently activated (i.e., "enabled" or "turned on") and deactivated (i.e., "disabled" or "turned off"). When virtually installed software is activated, access requests associated with the virtually installed software are generally redirected from a base file system and configuration to one or more memory locations to which the software has been virtually installed. When the virtually installed software is deactivated, access requests are not redirected, but allowed to pass through to the base file system and configuration.

As described in more detail further below, a software application may be virtualized as a virtual layer, which may be activated such that access requests associated with processes executing from the software application may be redirected from a base file system and configuration to the virtual layer. A virtual sub-layer associated with a component of the software application (e.g., an update such as a software patch) may be dynamically inserted in the virtual layer and selectively applied on a process-by-process basis without shutting down the software application or the processes executing from the software application. In certain embodiments, selective application of the virtual sub-layer may include determining whether a process executing from the software application launched before or after the dynamic insertion of the virtual sub-layer and selectively making the inserted virtual sub-layer visible or invisible to the process based on the determination. In certain examples, the virtual sub-layer may be made invisible to a process launched before the insertion and visible to a process launched after the insertion.

In the above-described or similar manner, a virtual sub-layer associated with a component of a software application may be dynamically inserted in an active virtual layer associated with a virtualized and activated software application, without having to terminate processes executing from the software application or deactivate the virtual layer. That is, the virtual layer may remain active during the insertion. Accordingly, components (e.g., updates) of software applications can be applied on the fly while generally avoiding the inconveniences, interruptions, and difficulties associated with conventional ways of updating software applications.

In similar manner, a virtual sub-layer associated with a component of a software application may be dynamically removed from an active virtual layer associated with a virtualized and activated software application, without having to deactivate the virtual layer. That is, the virtual layer may remain active during the removal. Accordingly, components (e.g., updates) of software applications can be unapplied on the fly while generally avoiding the inconveniences, interruptions, and difficulties associated with conventional ways of uninstalling software applications or components of software applications.

Turning now to the drawings, FIG. 1 illustrates an exemplary computing system 100 (or simply "the system 100") configured for dynamic insertion and removal of virtual software sub-layers as described herein. As shown, the computing system 100 may include a software management subsystem 110 communicatively coupled to computing devices 120-1 through 120-N (collectively "the computing devices 120"). The software management subsystem 110 and computing devices 120 may communicate with one another using any suitable communication technologies. For example, the software management subsystem 110 and computing devices 120 may communicate over a network 130 using any suitable communication technologies, including suitable network communication technologies, devices, signals, and protocols capable of supporting the processes and communications described herein. Network 130 may include any type, number, and configuration of networks capable of carrying communication signals between devices connected to the network 130, including but not limited to a local area network, a wide area network, a peer-to-peer network, a wireless network, a data network, an intranet, the Internet, and combinations or sub-combinations thereof. In other embodiments, the software management subsystem 110 and the computing devices 120 may communicate directly, such as over a communication bus or other communication link.

In certain embodiments, computing system 100 may include any computer hardware and/or instructions (e.g., software programs), or combinations of software and hardware, configured to perform the processes described herein. In particular, it should be understood that system 100 may include any of a number of computing devices, and may employ any of a number of computer operating systems, including, but by no means limited to, known versions and/or varieties of the Microsoft Windows, UNIX, Macintosh, and Linux operating systems.

Accordingly, the processes and/or operations described herein may be implemented at least in part as instructions, e.g., one or more computer program products, embodied on computer readable media and executable by one or more computing devices. In general, a processor (e.g., a microprocessor) receives instructions, e.g., from a memory, a computer readable medium, etc., and executes those instructions, thereby performing one or more processes or operations, including one or more of the processes and/or operations described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary computing system 100 is shown in FIG. 1, the exemplary components illustrated in FIG. 1 are not intended to be limiting. Indeed, additional or alternative components, implementations, or computing systems may be used to implement the principles and processes described herein.

Software management subsystem 110 may include or be implemented in one or more devices, including one or more devices configured to communicate with computing devices 120 over network 130. In certain embodiments, for example, software management subsystem 110 may include or be embodied on one or more server devices, which may be configured to operate server software such as Altiris® Notification Server™ software provided by Altiris, Inc., a division of Symantec Corporation. Software management subsystem 110 may include and may be configured to execute computer readable instructions (e.g., one or more computer program products) embodied on one or more computer readable media. The computer readable instructions may be configured to direct execution of one or more operations associated with virtualization and/or deployment of software and/or components of software to computing devices 120, including deployment of data representative of virtual sub-layers for dynamic insertion in virtual layers installed and activated in computing devices 120. Accordingly, a user of software management subsystem 110, such as an administrator of system 100, may utilize the software management subsystem 110 to control operations for virtualizing and/or deploying software applications and/or components of software applications to the computing devices 120 over network 130.

For example, software management subsystem 110 may receive or otherwise access a software application distributed by an entity such as the manufacturer or distributor of the software application. The software application may be made accessible for download over the Internet, for example. Under the direction of a user, software management subsystem 110 may deliver the software application to one or more of the computing devices 120 over network 130. Data representative of the software application may be transmitted using any suitable technologies and in any acceptable form.

In certain embodiments, the software management subsystem 110 may be configured to deliver an install executable for installing the software application to a computing device 120. In such embodiments, the computing device 120 may be configured to virtualize the software application. In other embodiments, the software management subsystem 110 may be configured to virtualize the software application and export data representative of the virtualized software application to the computing device 120. The computing device 120 may store the virtualized software application to one or more memory locations to virtually install the virtualized software application to the computing device 120. In other embodiments, the software management subsystem 110 and the computing device 120 may divide virtualization operations. Accordingly, the software management subsystem 110 and/or the computing device 120 may perform one or more software virtualization operations associated with virtualizing a software application.

Virtualization of a software application may include capturing the software application, which, in certain embodiments, may include capturing an install executable for the software application and generating one or more virtual layers for the software application. This may be performed in any of the ways described in U.S. Pat. No. 7,117,495, which was filed Jun. 11, 2003 and issued Oct. 3, 2006, the disclosure of which is hereby incorporated by reference in its entirety. A virtual layer may include one or more folders, sub-layers, or directories to which one or more components (e.g., program files, executables, configuration files, configuration information, settings, etc.) of the software application may be stored. A virtual layer may be stored to one or more memory locations to virtually install the virtual layer. As described further below, the memory locations are separate from memory locations associated with a base file system and configuration libraries of a computing device 120.

The process of capturing the software application may include generating mapping data that can be used for redirecting access requests generated by processes of a virtualized software application from base file system and configuration libraries to other memory locations associated with one or more virtual layers. Accordingly, processes executing from the virtualized software application can utilize content included in virtual layers without changing or using the base file system and configuration libraries. Virtual installation may also include generating, updating, and/or storing mapping data based on the memory locations to which the virtual layers are stored. The mapping data may be configured for use in redirecting access requests to memory locations associated with virtual layers. A virtually installed virtual layer may be conveniently activated and deactivated on a computing device 120, as described in more detail further below.

According to principles described herein, a virtually installed and activated virtual layer associated with a software application may be updated by dynamically inserting one or more virtual sub-layers in the virtual layer and/or by dynamically removing one or more virtual sub-layers from the virtual layer. As an example, software management subsystem 110 may receive and deploy a software update component (e.g., a software patch) to a computing device 120. As described above, the software management subsystem 110 may capture the software update component, create a virtual sub-layer associated with the update component, and export data representative of the virtual sub-layer to the computing device. Alternatively, an install executable for the software update component may be deployed to the computing device 120, which may capture the executable and generate a virtual sub-layer associated with the update component. Alternatively, software management subsystem 110 and the computing device 120 may divide operations for capturing the software update component and generating the virtual sub-layer.

The virtual sub-layer associated with the software update component may be dynamically inserted in the active virtual layer associated with the software application, without the virtual layer being deactivated and/or without processes executing from the software application being terminated. That is, the virtual layer may remain active during dynamic insertion of the virtual sub-layer. The virtual sub-layer may be selectively applied or not applied on a process-by-process basis, as described in more detail further below. In similar manner, the inserted virtual sub-layer may by dynamically removed from the active virtual layer without the virtual layer being deactivated, as is also described in more detail further below.

To illustrate principles of dynamic insertion and removal of virtual sub-layers in/from an active virtual layer in more detail, an exemplary software virtualization system 200 and exemplary configurations of virtualized software will now be described with reference to FIGS. 2A-E. The software virtualization system 200 and exemplary configurations shown in FIGS. 2A-E may be implemented in a computing device environment of one or more suitable computing devices, including any of the computing devices 120. A computing device 120 may include any hardware and computing instructions (e.g., one or more computer program products) capable of performing one or more of the processes and/or operations described herein, including communicating with the software management subsystem 110, and virtualizing and/or operating one or more virtualized software applications and/or components thereof, including executing one or more processes from the software applications, as described herein. The computing device 120 may include, but is in no way limited to, a personal computer, a workstation, a personal digital assistant, or any device having a processor, memory, input and output devices, and at least one fixed disk. It is contemplated that the principles described herein may be applied to these and other computing systems and devices, both existing and yet to be developed, using the methods and principles disclosed herein. Likewise, although many of the examples below refer to a computing device with a single base file system and configuration, the concepts, principles, and examples disclosed below may be extended to provide software virtualization, including dynamic insertion and/or removal of virtual software sub-layers, across several or many file systems and/or configurations (e.g., registries).

Figure 2A:
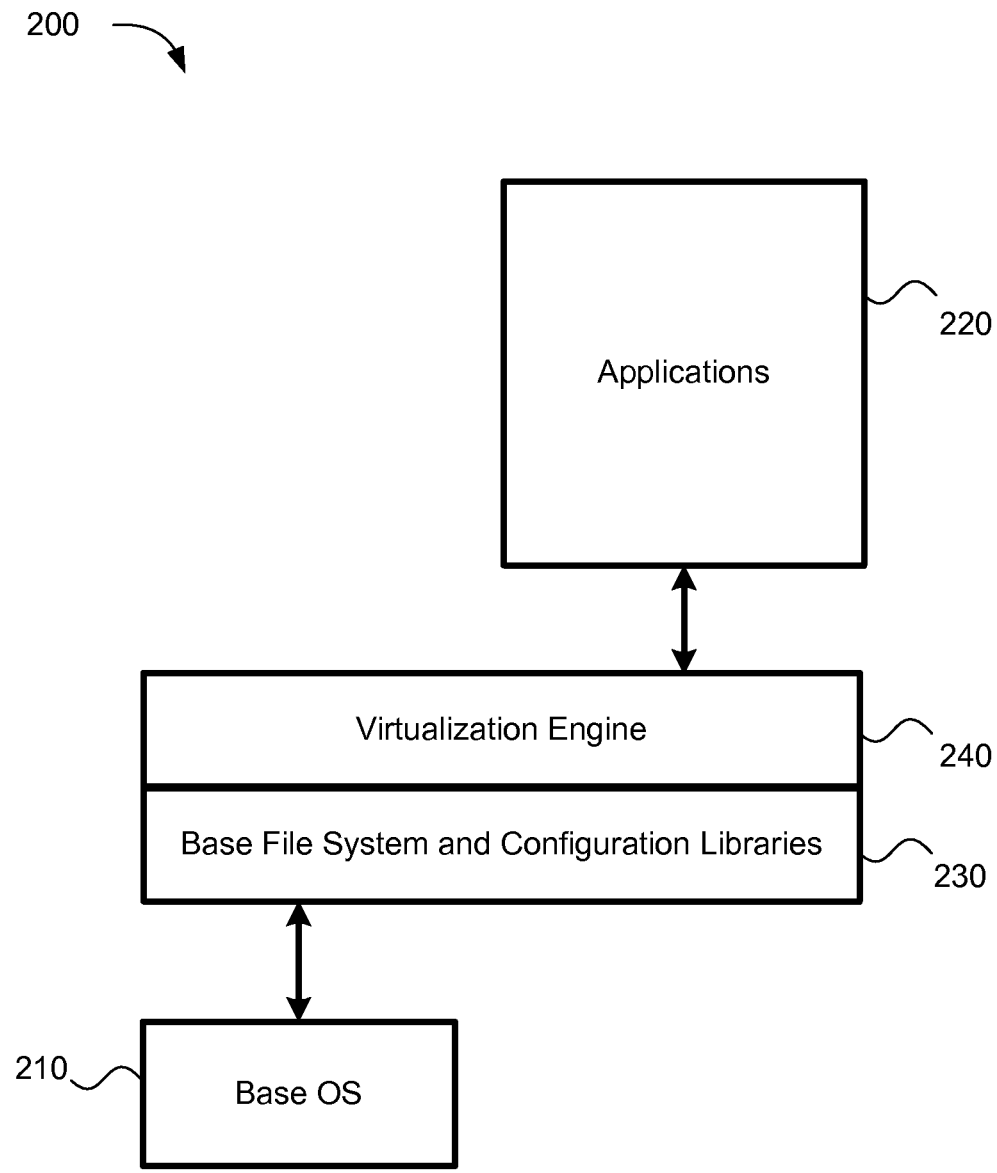
FIG. 2A illustrates an exemplary virtualization system in a computing device environment.

As shown in FIG. 2A, virtualization system 200 may be implemented in an exemplary computing device environment having a base operating system ("base OS") 210 forming a platform with which one or more applications 220 (e.g., software applications) can be run and files can be accessed in file systems. In certain embodiments, base OS 210 comprises Microsoft Windows operating system software.

Base OS 210 may include base configuration settings (e.g., registry settings) and files that are globally available to applications 220 for reading and writing operations. The configuration settings and files of the base OS 210 may be included in base file system and configuration libraries 230, also referred to as a base file system and configuration 230, for use in executing the functions of the base OS 210 and may include file systems, configuration settings such as registries, and other operating system functions. The base file system and configuration libraries 230, including the base files and configuration settings of the base OS 210, may be stored to a particular location in the memory of a computing device 120.

As shown in FIG. 2A, the virtualization system 200 may include a virtualization engine 240, which may include any hardware (e.g., a processor), computer-readable instructions embodied on a computer-readable medium (e.g., a computer program product), or combination thereof configured to perform one or more of the operations disclosed herein. In certain embodiments, virtualization engine 240 may be implemented as a software agent installed to a computing device 120.

Virtualization engine 240 may be configured to perform, or direct execution of, one or more software virtualization operations, including any of those disclosed herein. As an example, in certain embodiments, virtualization engine 240 may be configured to virtualize a software application, including performing and/or directing execution of any of the following operations: capturing the software application and/or components thereof, generating one or more virtual layers and/or virtual sub-layers, virtually installing the virtual layers and/or sub-layers (e.g., by storing them to memory locations), and generating mapping data for redirecting access requests from the base file system and configuration 230 to the virtual layers and/or sub-layers. In certain examples, the virtualization engine 240 may receive a non-virtualized software install executable for a software application and perform the above-listed steps to virtualize the software application. In other examples, the virtualization engine 240 may receive export data representing one or more virtual layers and/or sub-layers from the software management subsystem 110 and virtually install the virtual sub-layers and/or sub-layers (e.g., by storing them to one or more memory locations). The virtualization engine 240 may be configured to perform any of the operations for dynamic insertion and/or removal of virtual sub-layers disclosed herein.

Virtualization engine 240 may be configured to intercept access requests (e.g., file system and registry access requests) from applications 220 and to determine, based on predefined mapping data, where to redirect the access requests. Accordingly, virtualization engine 240 may selectively redirect access requests for content of the base file system and configuration 230 to content of a virtually installed and activated software application and/or components thereof that have been stored at a separate and isolated location in memory, such as in a virtual layer and/or sub-layer. In certain embodiments, the virtual installation and activation of a software application and/or components thereof allow redirections to be performed transparently such that the software application and operating system of the computing device 120 are unaware of the redirections.

In certain embodiments, the virtualization engine 240 is associated with the base file system and configuration 230 and/or the base OS 210. As an example, at least a portion of the virtualization engine 240 may be implemented as one or more drivers (e.g., filter drivers) at the operating system kernel level and configured to monitor input and output requests for files and configuration settings stored in the base file system and configuration libraries 230. This may be accomplished by monitoring calls that go through an OS kernel I/O subsystem. In certain embodiments, functionality for intercepting and redirecting access requests may be implemented based at least in part on the teachings included in the aforementioned U.S. Pat. No. 7,117,495, for example.

FIG. 2A illustrates the virtualization system 200 having the virtualization engine 240 configured to operate in a state in which there are no software applications virtually installed or activated in the computing environment. Accordingly, the virtualization engine 240 is generally configured to permit access requests from the applications 220 to continue on to content in the base file system and configuration libraries 230.

Figure 2B:
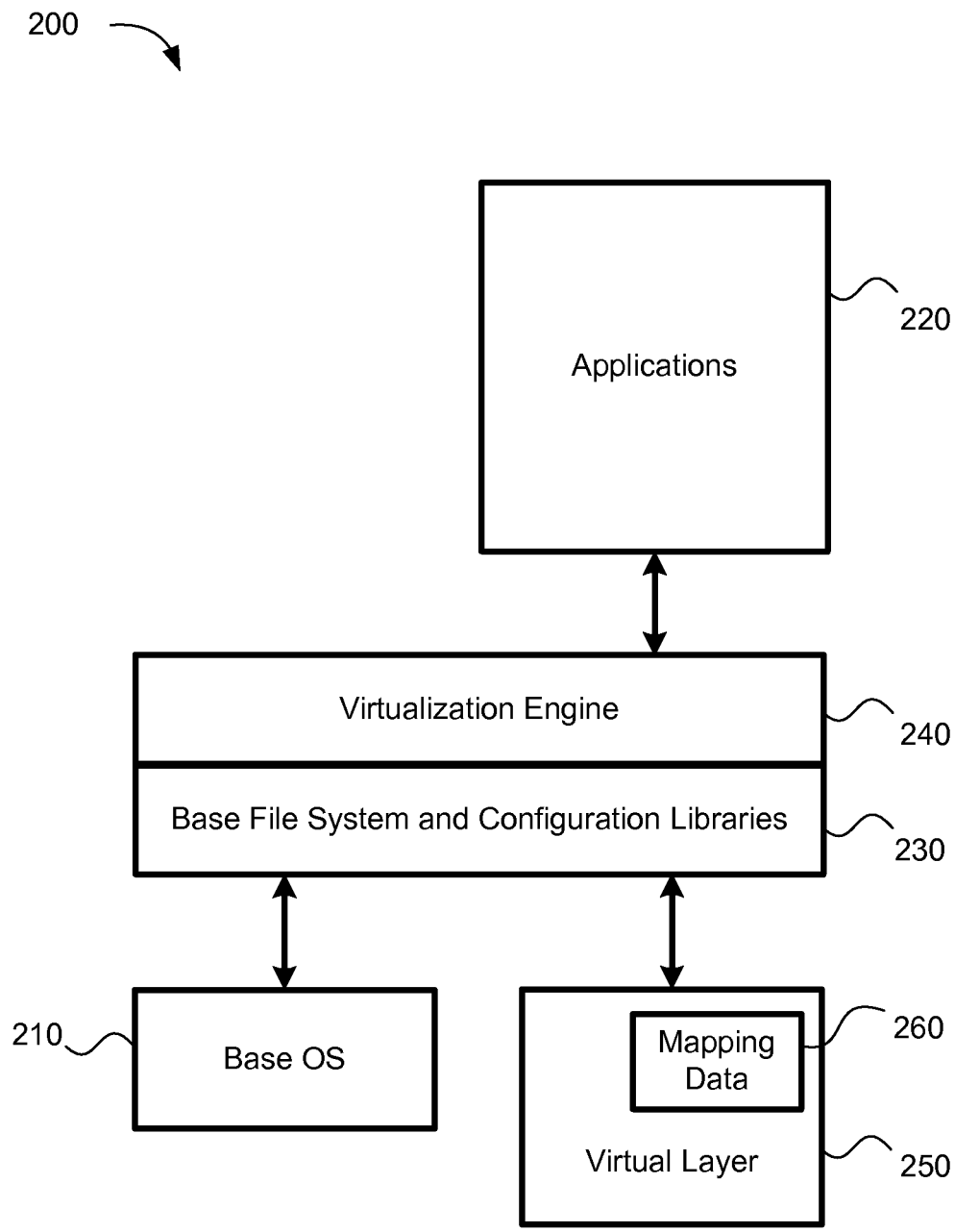
FIG. 2B illustrates the computing device environment of FIG. 2A with a virtual layer virtually installed thereto.

FIG. 2B illustrates the virtualization system 200 at a stage in which a software application is virtually installed to computing device 120 as virtual layer 250. Data representative of the application and/or the virtual layer 250 may be received from any suitable source and in any acceptable manner, including by transmission from the software management subsystem 110 over network 130.

As mentioned, the virtualization engine 240 may perform any of the virtualization operations described above to virtualize the software application. In some examples, this may include creating virtual layer 250 for the software application, storing content of the application to the virtual layer 250, and generating and storing mapping data 260 for the virtual layer 250. As shown in FIG. 2B, in some embodiments the mapping data 260 may be stored in the virtual layer 250. Alternatively, the mapping data 260 may be stored at another location external of the virtual layer 250. In other examples, the virtualization engine 240 may receive the virtual layer 250 from the software management subsystem 110 and virtually install the virtual layer 250 by storing it to a memory location.

The mapping data 260 may include any information potentially helpful for identifying an appropriate location in memory (e.g., virtual layer 250) to which an access request should be directed. Information in the mapping data 260 may be formatted and organized in any way that is suitable for the information to be used for redirecting access requests, activating virtual layer 250, and deactivating virtual layer 250. In certain embodiments, the mapping data 260 includes one or more tables of information organized such that the information can be searched by index, keyword, or other criterion.

As an example of generating mapping data 260, assume that a software application includes a particular application object (e.g., a DLL file) designed to replace a file object that is part of the base file system and configuration 230. During virtual installation of the application, the virtualization engine 240 and/or the software management subsystem 110 can identify the file object and/or its location (e.g., pathname), the application object and/or its location in the virtual layer 250, and the relationship between the file object and the application object and/or their respective locations. References to the identified information may be recorded and included as part of the mapping data 260. In this or another suitable manner, the mapping data 260 may be said to define relationships between the content of the virtual layer 250 and the content of the base file system and configuration 230.

Figure 2C:
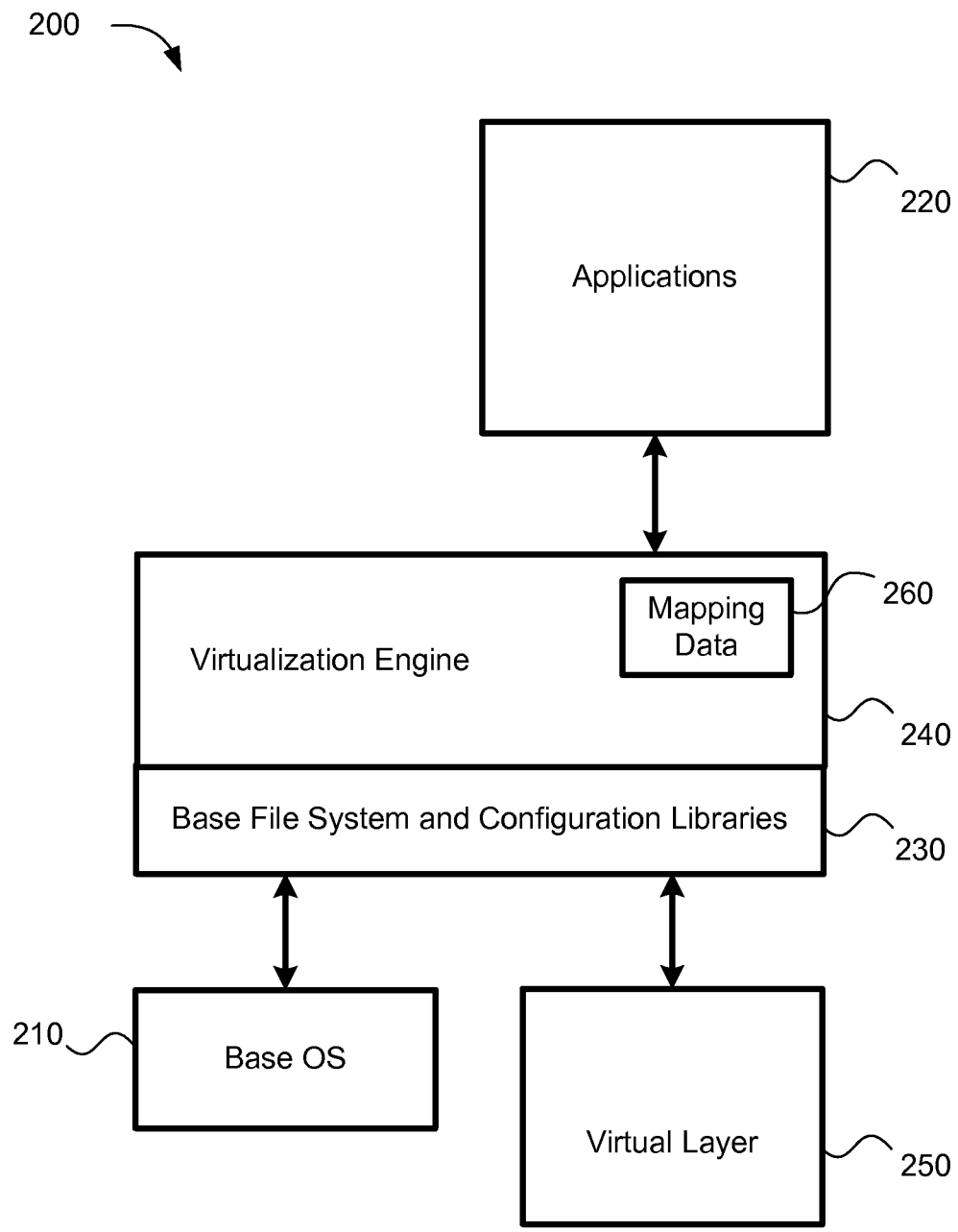
FIG. 2C illustrates the computing device environment of FIG. 2B with the virtual layer activated.

In certain embodiments, activation of the virtual layer 250 includes activating the mapping data 260 associated with the virtual layer 250 by applying the mapping data 260 to the virtualization engine 240. In FIG. 2C, activation of the mapping data 260 is represented by mapping data 260 being moved or a copy of the mapping data 260 being injected into the virtualization engine 240. In certain embodiments, this includes injecting the mapping data 260 into an OS kernel filter driver of the virtualization engine 240.

With virtual layer 250 activated, the virtualization engine 240 is configured to selectively redirect access requests associated with the corresponding software application from the base file system and configuration 230 to the virtual layer 250. For example, the virtualization engine 240 may intercept an access request from an application 220, the request including a reference for a particular file object or memory location of the base file system and configuration 230. The virtualization engine 240 may use the activated mapping data 260 to determine whether the reference is associated with an active virtual layer 250. This determination may be performed in any suitable manner, including searching the mapping data 260 for the reference. If a match is found, the virtualization engine 240 may redirect the access request to a corresponding object in the virtual layer 250. The corresponding object may then be accessed and returned to the application 220, the application 220 being unaware of the redirection having taken place.

For various reasons, it may be desirable to update virtual layer 250 with a component of the software application associated with the virtual layer 250. For example, a software patch or other update may become available for the software application. Conventional ways of updating the software application generally require shutting down the software application and/or deactivating the virtual layer 250 in order to apply the update component to the software application. Unfortunately, shutting down the software application and/or deactivating the virtual layer 250 in order to apply an update can significantly and undesirably interrupt normal use and operation of the software application and virtual layer 250, especially in a multiuser computing environment.

Figure 2D:
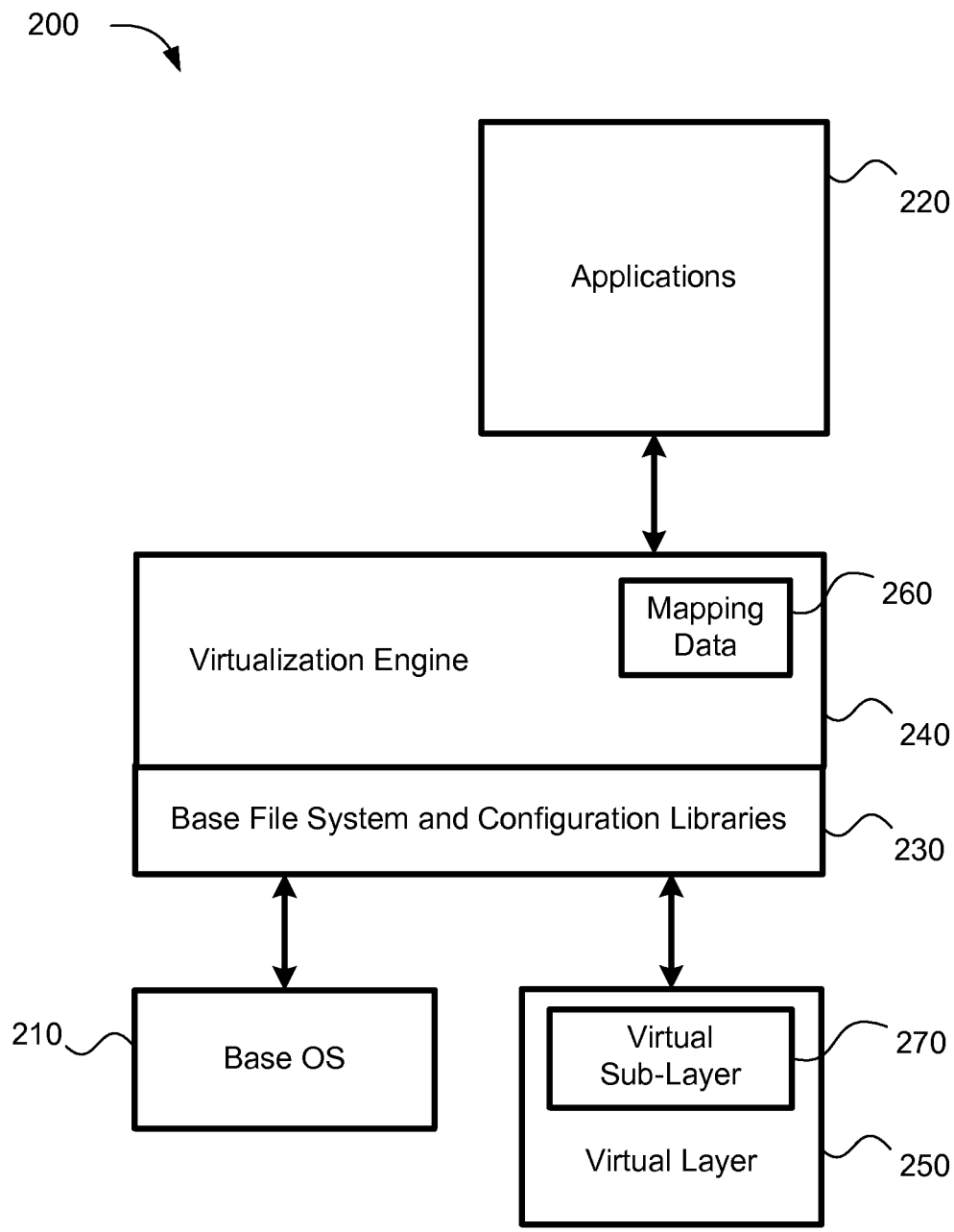
FIG. 2D illustrates the computing device environment of FIG. 2C with a virtual sub-layer inserted in the virtual layer.

According to principles described herein, one or more virtual sub-layers may be dynamically inserted in active virtual layer 250 without deactivating the virtual layer 250 or shutting down the associated software application. FIG. 2D illustrates the computing device environment of FIG. 2C with a virtual sub-layer 270 inserted in active virtual layer 250. Virtual sub-layer 270 may be associated with a virtualized component of the software application associated with virtual layer 250. For example, a software update (e.g., a software patch) for the software application may be virtualized to form virtual sub-layer 270. Virtualization of the software component may be performed using any of the virtualization operations described above. Virtual sub-layer 270 may be virtually installed such as by storing data representative of the virtual sub-layer 270 to one or more memory locations associated with virtual layer 250, or by otherwise associating virtual sub-layer 270 with virtual layer 250.

Insertion of the virtual sub-layer 270 may include configuring virtualization engine 240 and/or mapping data 260 to account for the virtual sub-layer 270 and to allow for dynamic insertion and selective application of the virtual sub-layer 270. In particular, virtualization engine 240 may be configured to selectively apply virtual sub-layer 270 on a process-by-process basis. Accordingly, insertion of the virtual sub-layer 270 may be performed dynamically without deactivating virtual layer 250 or terminating processes executing from virtual layer 250 during the insertion of virtual sub-layer 270. In certain embodiments, virtualization engine 240 may be configured to selectively apply virtual sub-layer 270 based on an attribute of a process executing from virtual layer 250. For instance, virtualization engine 240 may be configured to selectively apply virtual sub-layer 270 to a process launched after the insertion of the virtual sub-layer 270, and to refrain from applying virtual sub-layer 270 to a process launched before the insertion of the virtual sub-layer 270. When virtual sub-layer 270 is applied to a process, the process uses post-insertion virtual layer 250 including the inserted virtual sub-layer 270. That is, virtualization engine 240 will generally direct access requests associated with the process to the post-insertion virtual layer 250 having virtual sub-layer 270 inserted therein. When virtual sub-layer 270 is not applied to a process, the process uses the pre-insertion virtual layer 250 without virtual sub-layer 270 inserted therein. That is, virtualization engine 240 will generally direct access requests associated with the process to the virtual layer 250 as it existed before the insertion of the virtual sub-layer 270.

Selective application of the virtual sub-layer 270 may be accomplished in any suitable way. For example, insertion of virtual sub-layer 270 may include updating mapping data 260 with information associated with the virtual sub-layer 270. In certain embodiments, mapping data 260 may be updated to include instructions for conditionally routing access requests based on one or more attributes of processes associated with the access requests. For instance, mapping data 260 may be updated to include a conditional routing instruction configured to selectively direct an access request to a memory location associated with inserted virtual sub-layer 270 or to another memory location associated with pre-insertion virtual layer 250 based on one or more attributes of a process associated with the access request.

Figure 2E:
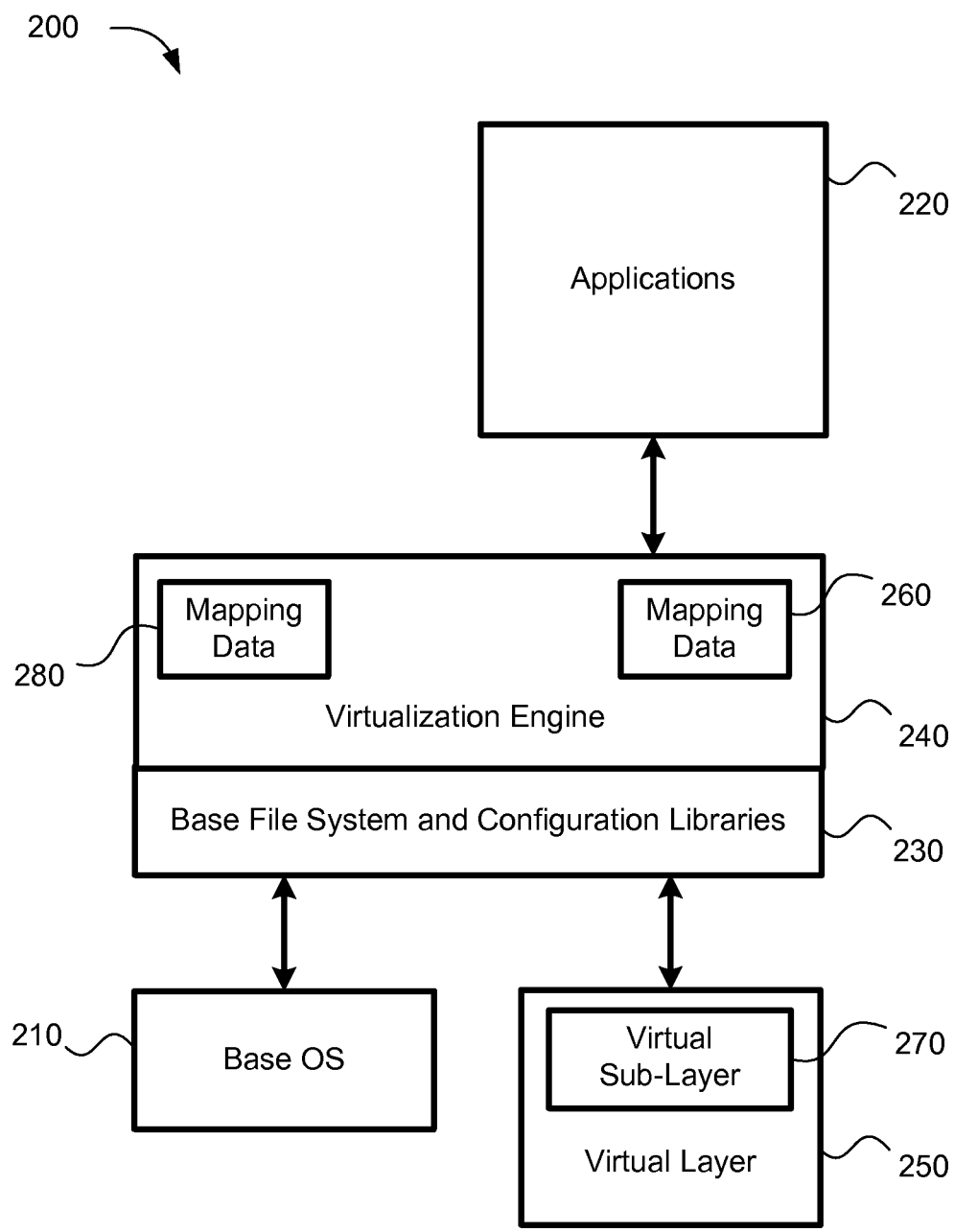
FIG. 2E illustrates the computing device environment of FIG. 2D with the virtual sub-layer configured for selective visibility and invisibility to a process executing from the virtual layer.

As another example, the insertion of the virtual sub-layer 270 may include providing another set of mapping data to virtualization engine 240. FIG. 2E illustrates the computing environment of FIG. 2D with mapping data 280 applied to virtualization engine 240. As shown, virtualization engine 240 may include mapping data 260 and mapping data 280. In this configuration, mapping data 260 may be configured to direct access requests to the pre-insertion virtual layer 250, and mapping data 280 may be configured to direct access requests to the post-insertion virtual layer 250 having virtual sub-layer 270 inserted therein. Virtualization engine 240 may be configured to selectively utilize mapping data 260 or mapping data 280 to route an access request based on one or more attributes of a process associated with the access request.

The above examples are illustrative only. Any suitable way of selectively applying the inserted virtual sub-layer 270 may be employed in other embodiments.

In certain embodiments, virtualization engine 240 is configured to use a process launch time attribute to selectively apply or not apply virtual sub-layer 270. In some examples, insertion of virtual sub-layer 270 may include virtualization engine 240 identifying and creating a list of processes executing from the virtual layer 250 before insertion of the of virtual sub-layer 270 (i.e., a "pre-insertion list"). The list may include processes launched before the insertion and still executing from the virtual layer 250 at the time of insertion. Virtualization engine 240 may utilize the list to determine that a process was launched before the insertion of virtual sub-layer 270 to selectively not apply the virtual sub-layer 270 to the process. For example, virtualization engine 240 may receive an access request from a process and query the list for the process. If the process is included in the list, virtualization engine 240 will not apply virtual sub-layer 270 to the process. Virtualization engine 240 may be configured to update the list such as by removing terminated processes from the list.

In other examples, virtualization engine 240 may be configured to identify process launch times and compare the launch times with an insertion time for virtual sub-layer 270. In certain examples, comparisons may be performed and determinations may be made dynamically as virtualization engine 240 receives access requests from processes executing from the software application. In other examples, the comparisons may be made and one or more lists of processes created in advance. The list(s), which may include a list of processes launched before the insertion such as the pre-insertion list described above, may then be queried when virtualization engine 240 receives access requests from the processes executing from the software application and the result of the query used to determine whether to apply or not apply virtual sub-layer 270 to the access requests.

Figure 3:
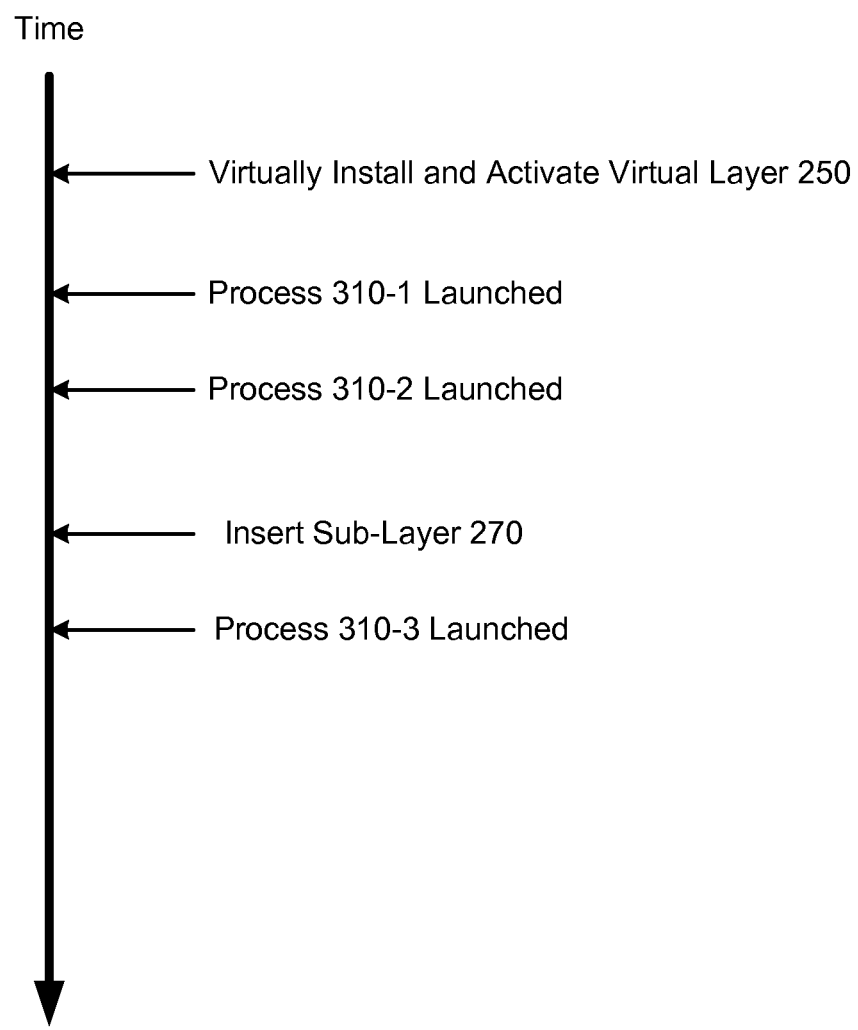
FIG. 3 illustrates a timeline of exemplary events related to dynamic insertion of a virtual sub-layer in a virtual layer.

To further illustrate selective, process-by-process application of virtual sub-layer 270, FIG. 3 illustrates an exemplary timeline of events associated with dynamic insertion of virtual sub-layer 270 in virtual layer 250. As shown in FIG. 3, virtual layer 250 may be virtually installed and activated. This may be accomplished in any of the ways described above. While virtual layer 250 is active, processes 310-1 and 310-2 may be launched and executed from the virtual layer 250. Virtual sub-layer 270 may then be dynamically inserted in virtual layer 250 in any of the ways described above, without terminating processes 310-1 and 310-2 and without deactivating virtual layer 250. After the dynamic insertion of virtual sub-layer 270 in virtual layer 250, process 310-3 may be launched and executed from virtual layer 250.

Figure 4A:
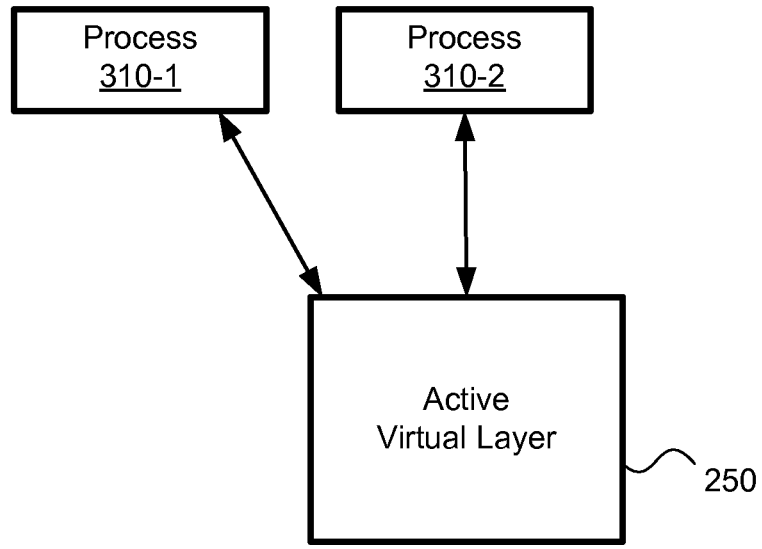
FIGS. 4A-C illustrate various insertion stages associated with events in FIG. 3.
Figure 4B:
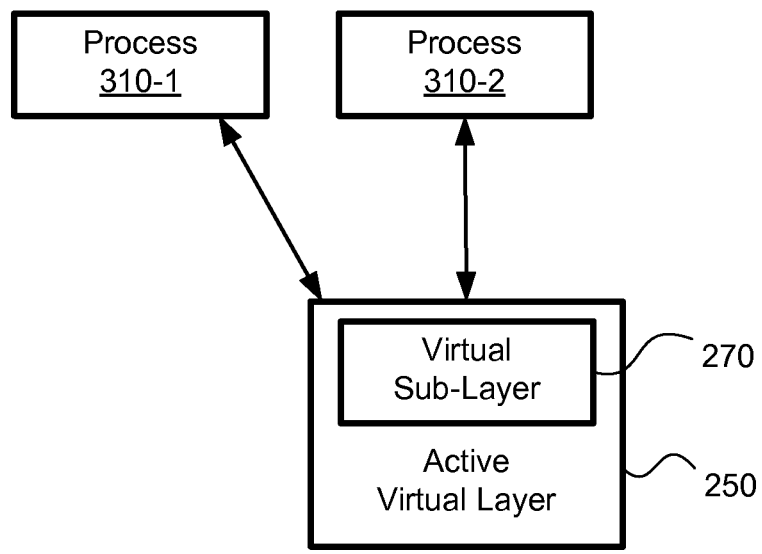
Figure 4C:
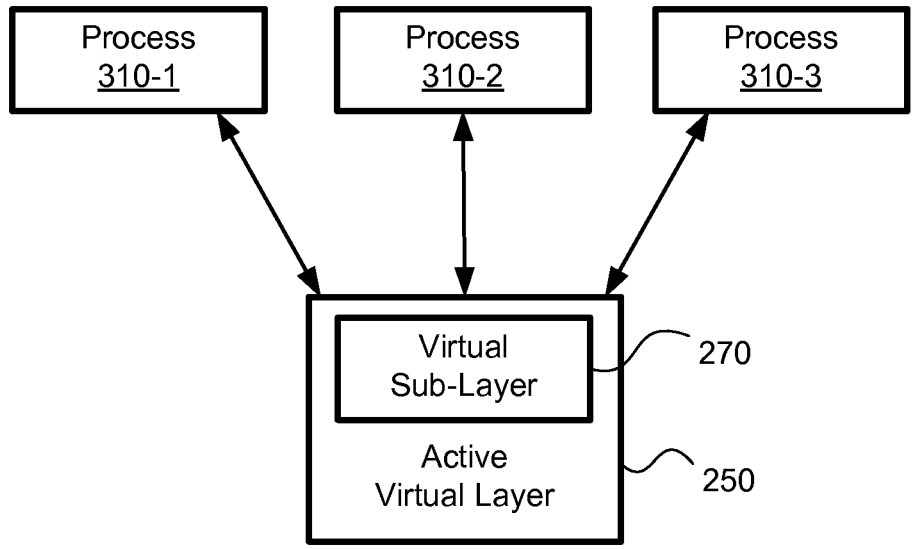

FIGS. 4A-C further illustrate this exemplary sequence of events in relation to virtual layer 250. FIG. 4A illustrates processes 310-1 and 310-2 executing from active virtual layer 250 before insertion of virtual sub-layer 270. FIG. 4B illustrates virtual sub-layer 270 inserted in active virtual layer 250.

FIG. 4C illustrates process 310-3 launching and executing from virtual layer 250 after the insertion of virtual sub-layer 270.

With the occurrence of the events illustrated in FIG. 3, virtualization engine 240 may be configured to selectively apply or not apply inserted virtual sub-layer 270 to processes 310-1, 310-2, and 310-3. For example, virtualization engine 240 may be configured to selectively apply virtual sub-layer 270 to process 310-3, which launched after the insertion of virtual sub-layer 270, and to selectively refrain from applying virtual sub-layer 270 to processes 310-1 and 310-2, which launched before the insertion of virtual sub-layer 270. Accordingly, existing processes 310-1 and 310-2 may continue to be executed from the pre-insertion virtual layer 250 during and after the insertion of virtual sub-layer 270 and without virtual sub-layer 270 being applied to the processes 310-1 and 310-2. Concurrently, new processes such as process 310-3 launched subsequent of the insertion may be executed from the post-insertion virtual layer 250 having virtual sub-layer 270 inserted therein.

Figure 5A:
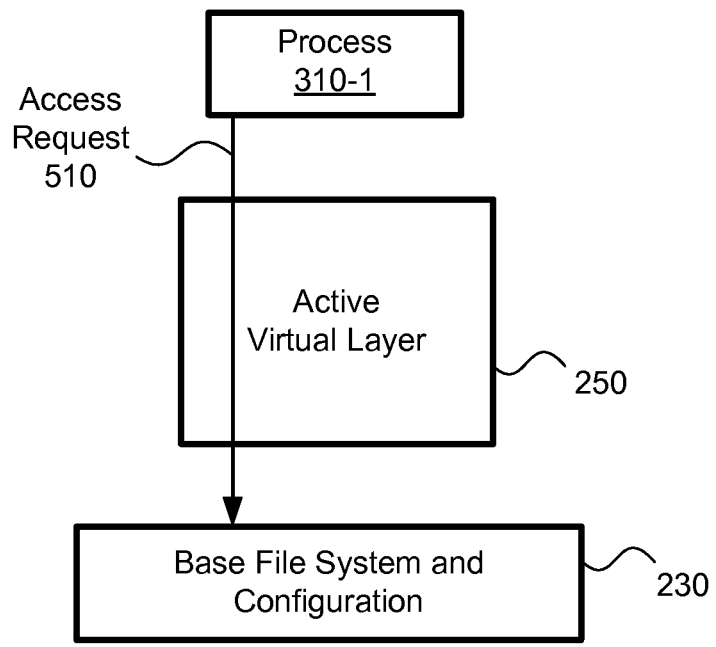
FIGS. 5A-C illustrate selective visibility and invisibility of a virtual sub-layer inserted in a virtual layer.
Figure 5B:
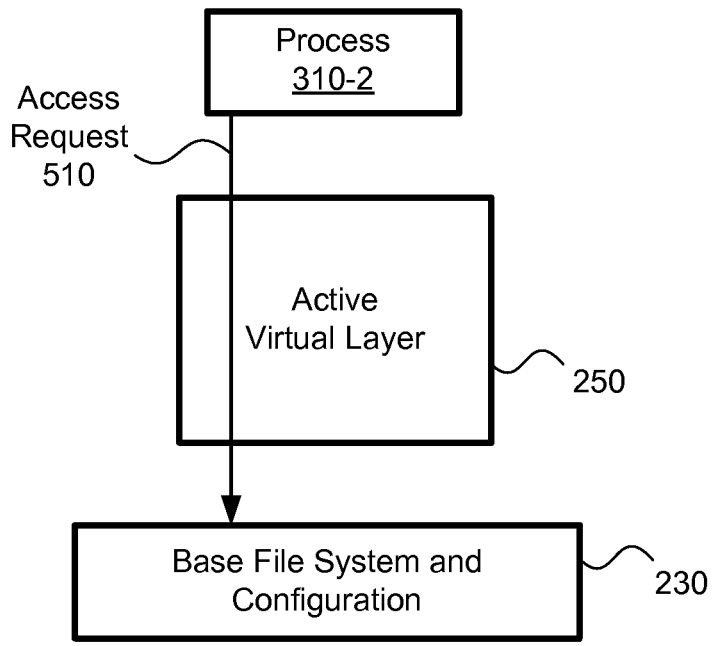
Figure 5C:
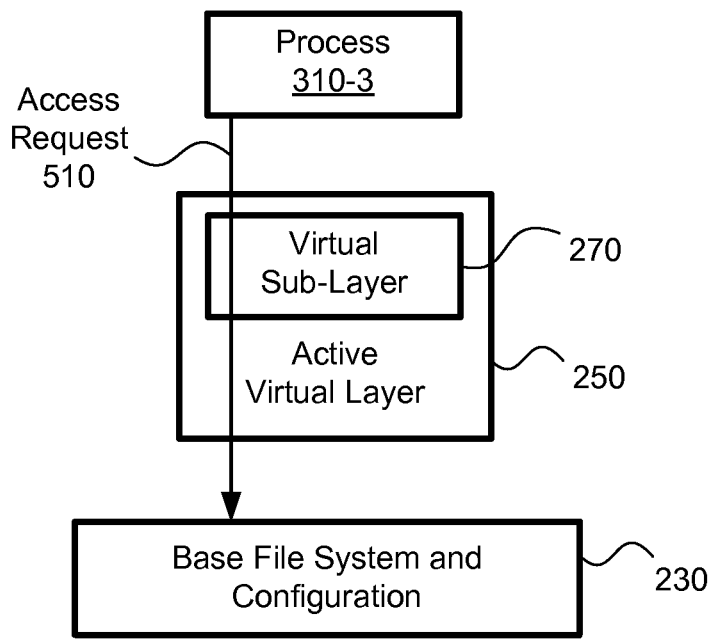

Selectively applying or not applying virtual sub-layer 270 to a process may be referred to as selectively making virtual sub-layer 270 visible or invisible to the process, respectively. FIGS. 5A-C illustrate selective visibility and invisibility of virtual sub-layer 270. FIG. 5A illustrates selective invisibility of virtual sub-layer 270 to process 310-1. An access request 510 generated by process 310-1 may be directed to virtual layer 250 and then to base file system and configuration 230 if the requested content is not in virtual layer 250. As shown, access request 510 is directed to the pre-insertion virtual layer 250 and does not see inserted virtual sub-layer 270. Similarly, FIG. 5B illustrates selective invisibility of virtual sub-layer 270 to process 310-2. In this or similar manner, virtual sub-layer 270 may be selectively made invisible to processes 310-1 and 310-2.

FIG. 5C illustrates selective visibility of virtual sub-layer 270 to process 310-3. Access request 510 generated by process 310-3 may be directed to virtual layer 250 and virtual sub-layer 270 and then to base file system and configuration 230 if the requested content is not in virtual layer 250 or virtual sub-layer 270. As shown, access request 510 is directed to the post-insertion virtual layer 250 and sees virtual sub-layer 270. In this or similar manner, virtual sub-layer 270 may be selectively made visible to process 310-3.

Figure 6:
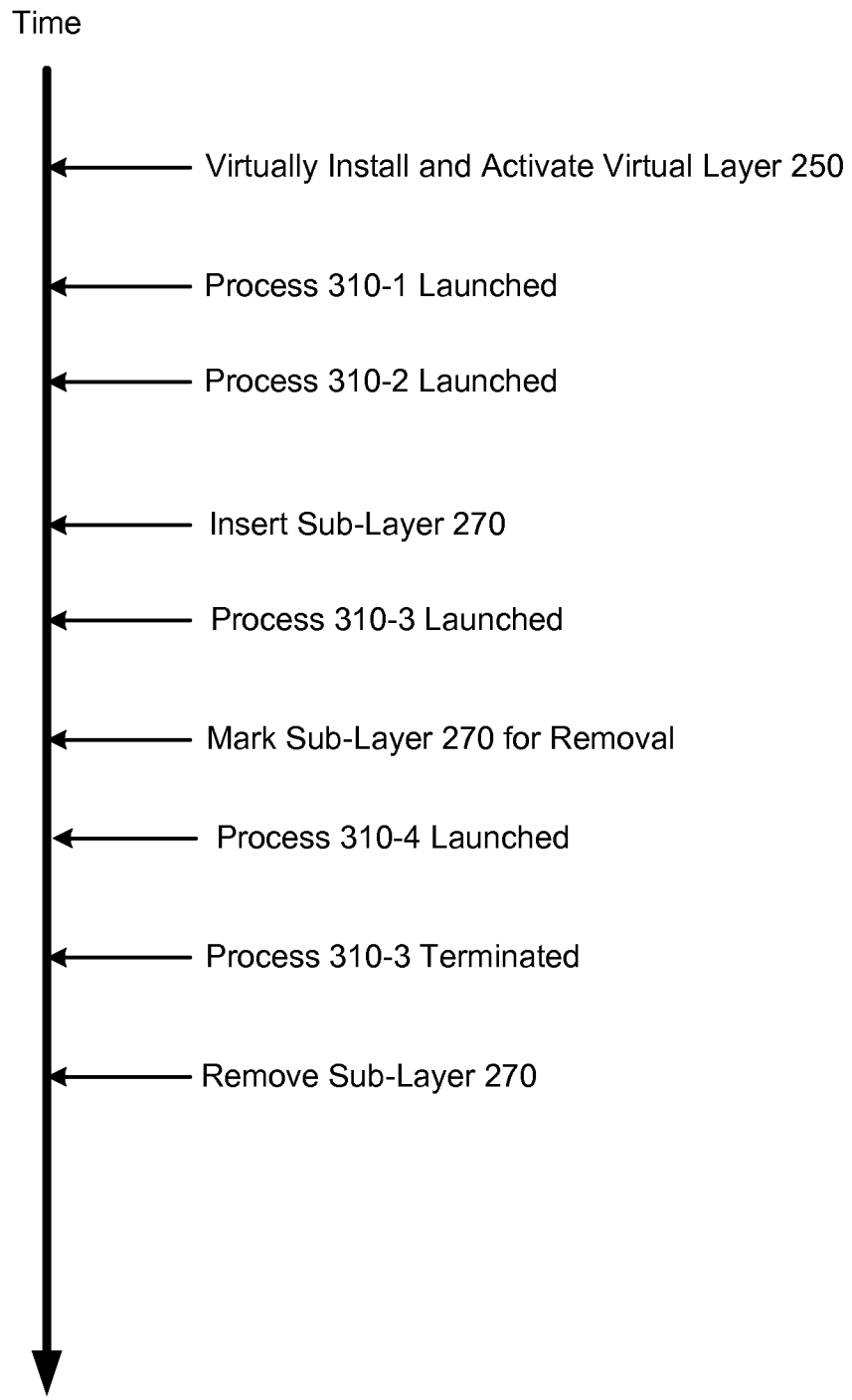
FIG. 6 illustrates a timeline of exemplary events related to dynamic insertion and removal of a virtual sub-layer in/from a virtual layer.

Components of a virtualized and active software application may be dynamically removed from the software application without shutting down the software application or terminating processes executing from the software application. This may be accomplished by dynamically removing virtual sub-layers such as virtual sub-layer 270 from the virtual layer 250 associated with the virtualized software application. In the example described above and illustrated in FIG. 3, for instance, inserted virtual sub-layer 270 may be dynamically removed from virtual layer 250. FIG. 6 illustrates an exemplary timeline of events associated with dynamic insertion and removal of virtual sub-layer 270 in/from virtual layer 250. As shown, the timeline in FIG. 6 may include the insertion-related events of FIG. 3. In particular, virtual sub-layer 270 has been dynamically inserted in virtual layer 250 and processes 310-1, 310-2, and 310-3 are executing from virtual layer 250 as described above.

At this point, it may be desirable to remove virtual sub-layer 270 from virtual layer 250. This may be accomplished dynamically without deactivating virtual layer 250. FIG. 6 illustrates events related to dynamical removal of virtual sub-layer 270. As shown, virtual sub-layer 270 may be marked for removal. Virtualization engine 240 may be configured to mark virtual sub-layer 270 for removal in any suitable way, including setting a value of a removal variable associated with the virtual sub-layer 270.

Once virtual sub-layer 270 have been marked for removal, virtualization engine 240 may be configured to selectively make virtual sub-layer visible or invisible to one or more processes based on one or more attributes of the processes. Selectively making virtual sub-layer 270 visible or invisible after it has been marked for removal may be accomplished in any suitable way. In certain embodiments, virtualization engine 240 may be configured to use a process launch time attribute to selectively apply or not apply virtual sub-layer 270 after the virtual sub-layer 270 has been marked for removal. In some examples, marking the virtual sub-layer 270 for removal may include virtualization engine 240 identifying and creating a list of processes executing from the virtual layer 250 before insertion of the of virtual sub-layer 270 and to which the virtual sub-layer 270 is made visible before marking the virtual sub-layer 270 for removal (i.e., a "pre-removal list"). Virtualization engine 240 may utilize the list to determine that the virtual sub-layer 270 was visible to a process before the virtual sub-layer 270 is marked for removal and to selectively continue to apply the virtual sub-layer 270 to the process. For example, virtualization engine 240 may receive an access request from a process and query the pre-removal list for the process. If the process is included in the list, virtualization engine 240 will continue to apply virtual sub-layer 270 to the process.

In the example shown in FIG. 6, virtual sub-layer 270 is visible to process 310-3 before the virtual sub-layer 270 is marked for removal. Accordingly, when virtual sub-layer 270 is marked for removal, a pre-removal list may include process 310-3. Conversely, virtual sub-layer 270 is invisible to processes 310-1 and 310-2 before the virtual sub-layer 270 is marked for removal. Accordingly, when virtual sub-layer 270 is marked for removal, processes 310-1 and 310-2 are omitted from the pre-removal list. Based on this list, virtualization engine 240 may continue to make virtual sub-layer 270 visible to process 310-3 after virtual sub-layer 270 has been marked for removal.

After virtual sub-layer 270 has been marked for removal, new process 310-4 may launch and execute from virtual layer 250, as shown in FIG. 6. Virtualization engine 240 may selectively make virtual sub-layer 270 invisible to process 310-4 based on the process 310-4 launching after virtual sub-layer 270 has been marked for removal. For example, virtualization engine 240 may query the pre-removal list and determine that process 310-4 is not included in the list. Accordingly, virtualization engine 240 may make virtual sub-layer 270 invisible to process 310-4.

Figure 7A:
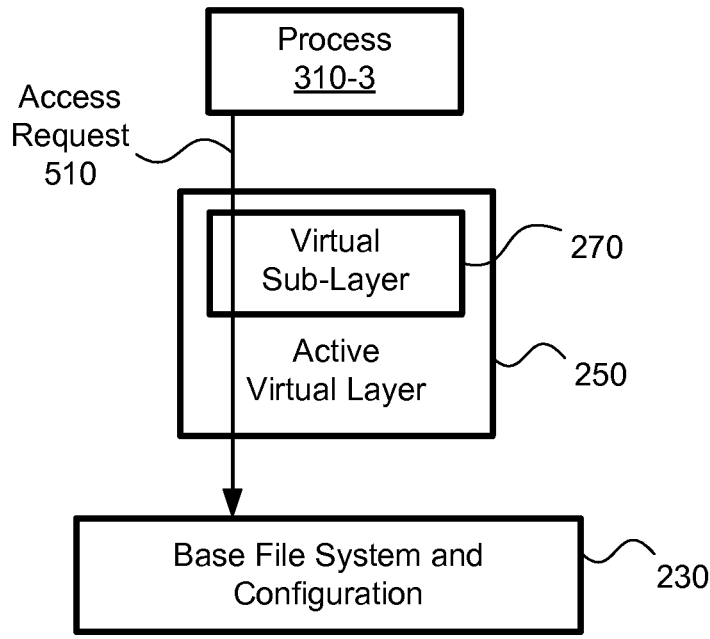
FIGS. 7A-B illustrate selective visibility and invisibility of a virtual sub-layer marked for removal from a virtual layer.
Figure 7B:
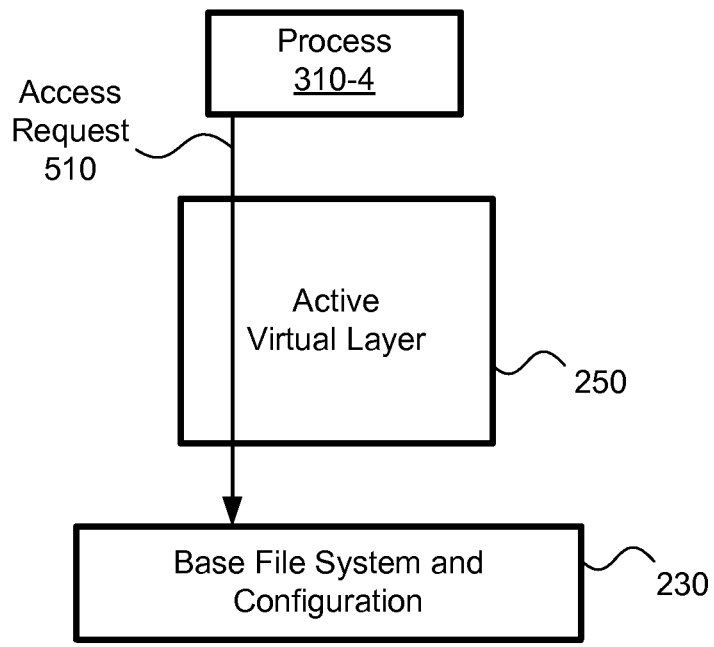

FIGS. 7A-B illustrate selective visibility and invisibility of virtual sub-layer 270 after it has been marked for removal from virtual layer 250. FIG. 7A illustrates selective visibility of virtual sub-layer 270 to existing process 310-3. Access request 510 generated by process 310-3 may be directed to virtual layer 250 and virtual sub-layer 270 and then to base file system and configuration 230 if the requested content is not found in the virtual layer 250 or virtual sub-layer 270. As shown, access request 510 is directed to virtual layer 250 and sees virtual sub-layer 270. In this or similar manner, virtual sub-layer 270 may continue to be made visible to process 310-3 after the virtual sub-layer 270 has been marked for removal.

FIG. 7B illustrates selective invisibility of virtual sub-layer 270 to new process 310-4 launched after virtual sub-layer 270 has been marked for removal. Access request 510 generated by process 310-4 may be directed to virtual layer 250 and then to base file system and configuration 230 if the requested content is not found in the post-marked virtual layer 250. As shown, access request 510 is directed to virtual layer 250 but does not see virtual sub-layer 270. In this or similar manner, virtual sub-layer 270 may be made invisible to process 310-4.

Virtualization engine 240 may be configured to update the pre-removal list such as by removing terminated processes from the list. Returning to FIG. 6, process 310-3 may be terminated after virtual sub-layer 270 has been marked for removal. Virtualization engine 240 may detect the termination of process 310-3 and remove it from the pre-removal list.

Virtualization engine 240 may be configured to detect when all processes to which virtual sub-layer 270 is visible are terminated. In the example of FIG. 6, process 310-3 is the only process to which virtual sub-layer 270 is visible after virtual sub-layer 270 has been marked for removal. Hence, when process 310-3 is terminated, none of the remaining processes 310-1, 310-2, or 310-4 executing from virtual layer 250 sees virtual sub-layer 270. Virtualization engine 240 may recognize that this is the case. For example, virtualization engine 240 may remove process 310-3 from the pre-removal list and determine that the pre-removal list is empty.

When the virtualization engine 340 detects that virtual sub-layer 270 is no longer visible to any processes executing from virtual layer 250, virtualization engine 240 may dynamically remove (e.g., delete) virtual sub-layer 270 from virtual layer 250, as shown in FIG. 6. The removal may be performed dynamically without deactivating virtual layer 250 during the removal. Accordingly, processes executing from the virtual layer 250 may continue to be executed during removal of virtual sub-layer 270 from virtual layer 250.

Marking and dynamically removing virtual sub-layer 270 from virtual layer 250 may be accomplished in any suitable way. In certain embodiments, virtualization engine 240 is configured to update mapping data 260 and/or mapping data 280 to reflect that virtual sub-layer 270 has been marked for removal and/or removed from virtual layer 250.

In any of the examples described above, virtualization engine 240 may be configured to provide one or more graphical user interfaces ("GUIs"), such as a pop-up window, for presentation to a user. Such a GUI may provide the user with one or more tools for controlling software virtualization operations. As an example, a GUI may present a dialogue asking the user for permission to request and bring down (e.g., download), virtually install, enable, disable, and/or remove one or more virtual sub-layers 270. In certain embodiments, the software management subsystem 110 may be configured to provide similar GUIs and tools to a user of the software management subsystem 110 (e.g., an administrator of computing system 100).

Figure 8:
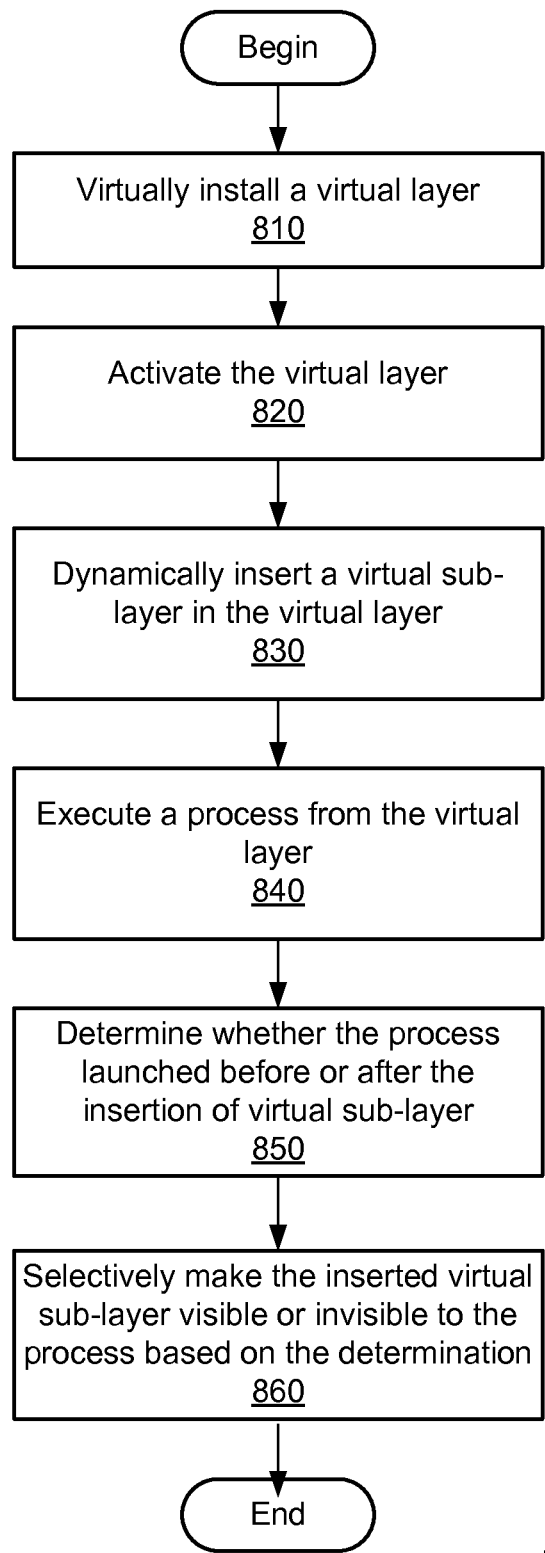
FIG. 8 illustrates an exemplary method of dynamic insertion of a virtual software sub-layer.

FIG. 8 illustrates an exemplary method of dynamic insertion of a virtual sub-layer. While FIG. 8 illustrates exemplary steps according to one embodiment, other embodiments may omit, add to, reorder, and/or modify any of the steps shown in FIG. 8.

In step 810, a virtual layer is virtually installed. Step 810 may be performed in any of the ways described above, including the software management subsystem 110 and/or virtualization engine 240 virtually installing virtual layer 250 to a computing device 120.

In step 820, the virtual layer is activated. Step 820 may be performed in any of the ways described above, mapping data 260 being applied to virtualization engine 240 to activate virtual layer 250.

In step 830, a virtual sub-layer is dynamically inserted in the virtual layer. Step 830 may be performed in any of the ways described above, including the software management subsystem 110 transmitting data representing the virtual sub-layer 270 to the computing device 110 over network 130, and virtualization engine 240 dynamically inserting virtual sub-layer 270 in active virtual layer 250 without deactivating virtual layer 250.

In step 840, a process is executed from the virtual layer. Step 840 may be performed in any of the ways described above, including the computing device 120 executing the process from the virtual layer 250.

In step 850, it is determined whether the process launched before or after the dynamic insertion of the virtual sub-layer in virtual layer. Step 850 may be performed in any of the ways described above.

In step 860, the inserted virtual sub-layer is selectively made visible or invisible to the process based on the determination made in step 850. Step 560 may be performed in any of the ways described above, including virtualization engine 240 selectively directing an access request associated with the process to the pre-insertion virtual layer 250 or the post-insertion virtual layer 250 including virtual sub-layer 270 inserted therein. In certain examples, step 860 may include making the virtual sub-layer invisible to the process when the process is determined to have launched before the insertion in step 830. In other examples, step 860 may include making the virtual sub-layer visible to the process when the process is determined to have launched after the insertion in step 830.

Figure 9:
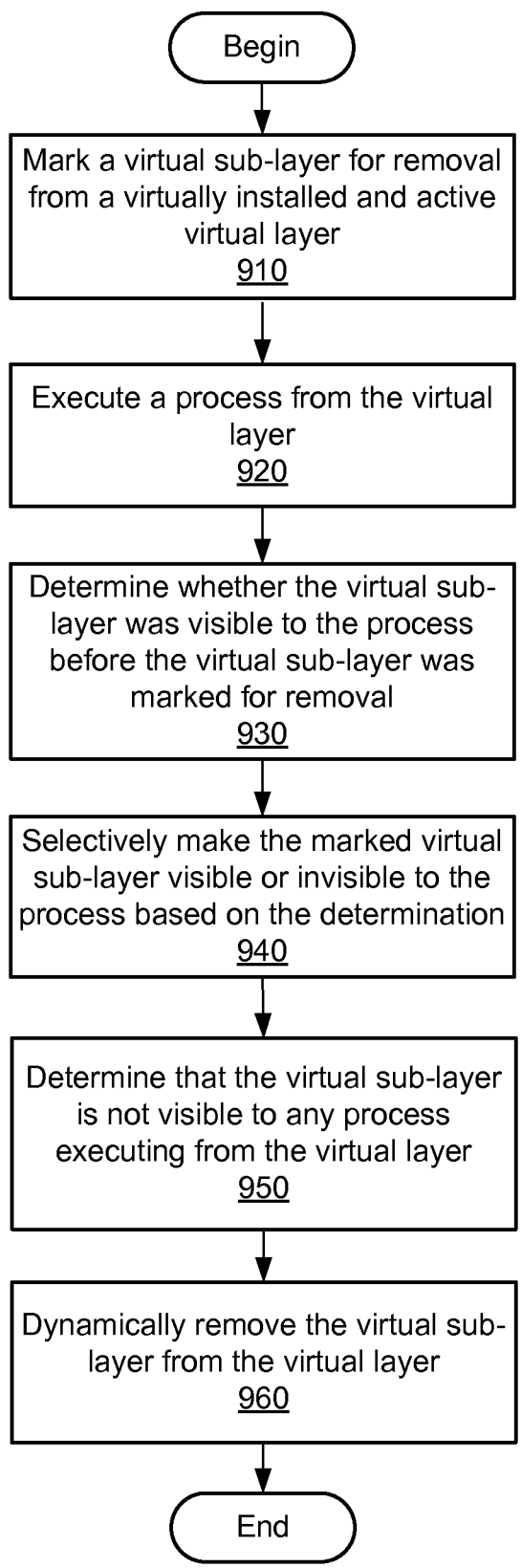
FIG. 9 illustrates an exemplary method of dynamic removal of a virtual software sub-layer.

FIG. 9 illustrates an exemplary method of dynamic removal of a virtual sub-layer. While FIG. 9 illustrates exemplary steps according to one embodiment, other embodiments may omit, add to, reorder, and/or modify any of the steps shown in FIG. 9.

In step 910, a virtual sub-layer is marked for removed from a virtually installed and active virtual layer. Step 910 may be performed in any of the ways described above, including marking virtual sub-layer 270 for removal from virtual layer 250 and creating a pre-removal list of any existing processes to which virtual sub-layer 270 is visible before marking the virtual sub-layer 270 for removal.

In step 920, a process is executed from the virtual layer. Step 920 may be performed in any of the ways described above, including the computing device 120 executing the process from the virtual layer 250.

In step 930, it is determined whether the virtual sub-layer was visible to the process before the virtual sub-layer was marked for removal in step 910. Step 930 may be performed in any of the ways described above, including querying a pre-removal list for the process.

In step 940, the marked virtual sub-layer is selectively made visible or invisible to the process based on the determination made in step 930. Step 940 may be performed in any of the ways described above, including virtualization engine 240 selectively directing an access request associated with the process to the virtual layer 250 with the virtual sub-layer 270 visible therein or to the virtual layer 250 with the virtual sub-layer 270 invisible therein. In certain examples, step 940 may include making the virtual sub-layer visible to the process when the virtual sub-layer is determined to have been visible to the process before the virtual sub-layer is marked for removal in step 910. In other examples, step 940 may include making the virtual sub-layer invisible to the process when the process is determined to have launched after the virtual sub-layer is marked for removal in step 910.

In step 950, it is determined that the virtual sub-layer is not visible to any process executing from the virtual layer. Step 950 may be performed in any of the ways described above, including virtualization engine 240 recognizing termination of a process, removing the process from the pre-removal list, and recognizing the pre-removal list to be empty.

In step 960, the virtual sub-layer dynamically removed. Step 860 may be performed in any of the ways described above, including removing virtual sub-layer 270 from virtual layer 250 without deactivating the virtual layer 250 (i.e., virtual layer 250 remains active during the removal).

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A method, comprising:
   providing, on a computing device comprising a base file system and a base configuration of a base operating system, a virtualization system;
   virtually installing, to the computing device, a software application by installing the software application to a virtual application layer that is configured such that, when the virtual application layer is activated, the virtualization system redirects access requests that were originally directed to the base file system and/or the base configuration and that are associated with the software application from the base file system and/or the base configuration to the virtual application layer and, when the virtual application layer is deactivated, the virtualization system allows access requests that were originally directed to the base file system and/or the base configuration and that are associated with the software application to pass through to the base file system and/or the base configuration instead of being redirected to the virtual application layer;
   activating the virtual application layer such that access requests associated with the software application are redirected, by the virtualization system, from the base file system and/or the base configuration to the virtual application layer;
   identifying a subset of functionality associated with the software application that is not currently included in the virtual application layer; and
   updating the virtual application layer to include the subset of functionality associated with the software application by dynamically inserting a virtual sub-layer that includes the subset of functionality associated with the software application into the virtual application layer, wherein the virtual application layer remains active during the dynamic insertion of the virtual sub-layer.

2. The method of claim 1, further comprising:
   executing a process from the virtual application layer;
   determining whether the process launched before or after the insertion of the virtual sub-layer; and
   selectively making the inserted virtual sub-layer one of visible and invisible to the process based on the determination.

3. The method of claim 2, wherein selectively making the inserted virtual sub-layer one of visible and invisible to the process based on the determination comprises:
   making the inserted virtual sub-layer visible to the process when the process is determined to have been launched after the insertion of the virtual sub-layer; and
   making the inserted virtual sub-layer invisible to the process when the process is determined to have been launched before the insertion of the virtual sub-layer.

4. The method of claim 2, wherein the process launched before the insertion of the virtual sub-layer, and the method further comprises continuing to execute the process during the dynamic insertion of the virtual sub-layer in the virtual application layer.

5. The method of claim 4, further comprising:
   executing another process from the virtual application layer;
   determining that the other process launched after the insertion of the virtual sub-layer; and
   selectively making the inserted virtual sub-layer visible to the other process based on the determination that the other process launched after the insertion of the virtual sub-layer.

6. The method of claim 1, wherein the subset of functionality associated with the software application comprises an update for the software application.

7. The method of claim 1, further comprising:
   marking the inserted virtual sub-layer for removal from the virtual application layer;
   determining that the virtual sub-layer is not visible to any process executing from the virtual application layer; and
   dynamically removing the virtual sub-layer from the virtual application layer, wherein the virtual application layer remains active during the dynamic removal of the virtual sub-layer.

8. The method of claim 1, further comprising:
   marking the inserted virtual sub-layer for removal from the virtual application layer;
   executing a process from the active virtual application layer;
   determining that the virtual sub-layer was visible to the process before the virtual sub-layer was marked for removal; and
   selectively continuing to make the marked virtual sub-layer visible to the process based on the determination that the virtual sub-layer was visible to the process before the virtual sub-layer was marked for removal.

9. The method of claim 8, further comprising:
   executing another process from the active virtual application layer;
   determining that the other process launched after the virtual sub-layer was marked for removal; and
   selectively making the marked virtual sub-layer invisible to the other process based on the determination that the other process launched after the virtual sub-layer was marked for removal.

10. A method, comprising:
    identifying, on a computing device having a base file system and a base configuration of a base operating system, a virtualization system;
    identifying a virtual application layer to which a software application has been virtually installed such that, when the virtual application layer is activated, the virtualization system redirects access requests that were originally directed to the base file system and/or the base configuration and that are associated with the software application from the base file system and/or the base configuration to the virtual application layer and, when the virtual application layer is deactivated, the virtualization system allows access requests that were originally directed to the base file system and/or the base configuration and that are associated with the software application to pass through to the base file system and/or the base configuration instead of being redirected to the virtual application layer;

identifying a subset of functionality associated with the software application that is not currently included in the virtual application layer;

updating the virtual application layer to include the subset of functionality associated with the software application by dynamically inserting a virtual sub-layer that includes the subset of functionality associated with the software application into the virtual application layer;

executing at least one process from the virtual application layer, the virtual application layer being activated such that access requests associated with the software application are redirected, by the virtualization system, from the base file system and/or the base configuration to the virtual application layer.

11. The method of claim 10, wherein the process includes a plurality of processes executing from the virtual application layer, the plurality of processes including a first process and a second process, and wherein the virtual sub-layer is selectively made invisible to the first process and visible to the second process.

12. The method of claim 11, further comprising:

determining that the first process launched before the dynamic insertion of the virtual sub-layer;

determining that the second process launched after the dynamic insertion of the virtual sub-layer; and wherein the virtual sub-layer is selectively made invisible to the first process and visible to the second process based on the determinations.

13. The method of claim 12, further comprising continuing to execute the first process during the dynamic insertion of the virtual sub-layer in the virtual application layer.

14. The method of claim 10, wherein the virtual sub-layer is dynamically inserted without deactivating the virtual application layer.

15. A system, comprising:

a virtualization system provided on a computing device having a base file system and a base configuration of a base operating system;

a virtual application layer to which a software application has been virtually installed such that, when the virtual application layer is activated, the virtualization system redirects access requests that were originally directed to the base file system and/or the base configuration and that are associated with the software application from the base file system and/or the base configuration to the virtual application layer and, when the virtual application layer is deactivated, the virtualization system allows access requests that were originally directed to the base file system and/or the base configuration and that are associated with the software application to pass through to the base file system and/or the base configuration instead of being redirected to the virtual application layer; and a virtualization engine within the computing device, wherein the virtualization engine is configured to:

identify a subset of functionality associated with the software application that is not currently included in the virtual application layer;

update the virtual application layer to include the subset of functionality associated with the software application by dynamically inserting a virtual sub-layer that includes the subset of functionality associated with the software application into the virtual application layer; and activate the virtual application layer such that access requests associated with the software application are redirected, by the virtualization system, from the base file system and/or the base configuration to the virtual application layer.

16. The system of claim 15, wherein the computing device is configured to execute a process from the active virtual application layer, and wherein the virtualization engine is further configured to:

determine whether the process launched before or after the insertion of the virtual sub-layer; and selectively make the inserted virtual sub-layer one of visible and invisible to the process based on the determination.

17. The system of claim 16, wherein the virtualization engine is further configured to:

make the inserted virtual sub-layer visible to the process when the process is determined to have launched after the insertion of the virtual sub-layer; and make the inserted virtual sub-layer invisible to the process when the process is determined to have launched before the insertion of the virtual sub-layer.

18. The system of claim 15, wherein the virtualization engine is further configured to:

mark the inserted virtual sub-layer for removal from the virtual application layer;

determine that the virtual sub-layer is not visible to any process executing from the virtual application layer; and dynamically remove the virtual sub-layer from the active virtual application layer.

19. The system of claim 15, further comprising a software management subsystem communicatively coupled to the computing device, wherein the software management subsystem is configured to provide data representative of the virtual sub-layer to the computing device.

20. The system of claim 15, wherein the subset of functionality associated with the software application comprises a software patch for the software application.

* * * * *